March 8, 1949.  A. C. THOMPSON  2,463,657
TRACTOR BRAKE LOCK
Filed Feb. 3, 1948
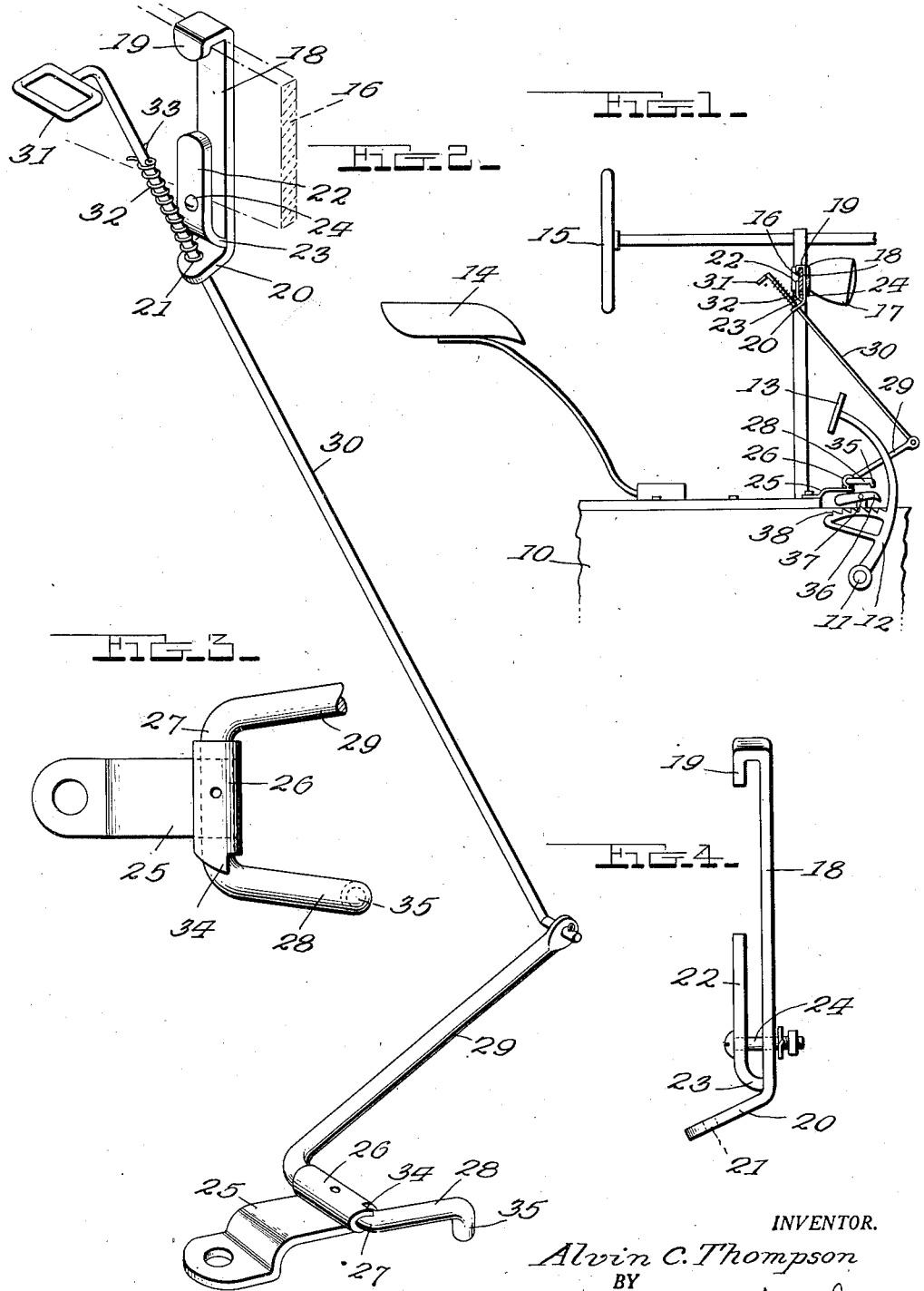
INVENTOR.
Alvin C. Thompson
BY
Bryant & Lowry
attys.

Patented Mar. 8, 1949

2,463,657

UNITED STATES PATENT OFFICE 2,463,657

TRACTOR BRAKE LOCK

Alvin C. Thompson, Waukon, Iowa

Application February 3, 1948, Serial No. 6,072

1 Claim. (Cl. 74—540)

This invention relates to brake pedal controls.

One important object of the invention is to provide a novel arrangement by which a brake pedal may be locked in applied position by manually operated means which can be reached by the driver of a tractor or the like without the necessity of the driver stooping over.

Another important object of the invention is to so construct an apparatus of the foregoing character that it requires no manual intervention for release of the brake pedal after it has been locked in applied position.

A further object of the invention is to provide a novel construction for the purpose set forth wherein, after the brake is applied, further pressure on the brake pedal will release a gravity controlled latch holding the brake pedal in set position.

A still further object of the invention is to provide a device of this character which may be applied without difficulty to practically any existing tractor.

With these and other objects in view, as will be plain from what follows, the invention consists of a novel combination of simple parts as herein fully described, shown in certain drawings hereto attached, and set forth in the appended claim.

In the drawings the same characters of reference are used for the same parts throughout the various views, and Figure 1 is a fragmentary view of a portion of a tractor in side elevation and showing the present invention applied thereto;

Figure 2 is a perspective view showing certain details of the invention;

Figure 3 is a plan view of a rock arm journal used in the invention, the view also disclosing part of the rock arm; and Figure 4 shows a detail of a clamp used in this invention.

In order to make clear the application and operation of this invention, there has been shown in Figure 1 a portion 10 of a tractor body wherethrough extends a brake shaft 11 on which is fixed a pedal lever 12 provided with the usual pedal 13. This pedal is, of course, positioned for convenient reaching by a foot of an operator seated in the usual seat 14 behind the steering wheel 15. At 16 is a cross-bar carrying the headlights of the tractor, one light being shown at 17.

On the light bracket 16 is mounted a clamp which includes a vertical member 18 having at its upper end a hook shaped portion 19 which engages over the top edge of the bracket 16. The vertical member 18 extends well below the bracket 16 and has an out-turned end 20 wherethrough extends a hole 21. A clip 22 is positioned opposite the lower end of the member 18 to lie on the opposite side of the cross-bar 16 to the member 18 and the clip 22 has an inturned end 23 which engages against the member 18 below the lower edge of the cross-bar 16. A bolt and nut arrangement 24, passing through said members 18 and 22 serves to securely mount these parts on the member 16.

On the top of the portion 10, which may preferably be the gear-shift housing of the tractor, is fixed a bracket 25 having at one end a journal bearing 26 wherein is mounted the journal 27 of a bell-crank lever having a short arm 28 and a long arm 29. Journalled in the end of the long arm 29 is the lower end of a push rod 30 which passes upwardly through the hole 21 and is provided on its upper end with a hand grip 31. Above the extension 26 the rod 30 is surrounded by a coiled compression spring 32 which bears, at its lower end, against said extension 20 and, at its upper end, against a cross-pin 33 so that the rod 30 will be constantly urged upward. The bearing 26 is provided with a lug 34 engageable by the arm 28 to prevent excessive upward movement of the arm 29 under the influence of the spring 32.

The arm 28 has a down-turned end 35 which is positioned above one end of a latch lever 36 pivoted intermediate its ends to a bracket 37 and having its other end much heavier than the end engaged by the arm 28. Extending from the lever 12 is toothed sector 38 wherewith the latch lever 36 may engage.

Now, in the operation of this device, when it is desired to apply and lock the brake of the vehicle in applied position, the pedal 13 is pushed forwardly until the brakes have been set to the desired extent. The driver grasps the handle 31 and forces the rod 30 downwardly against the action of the spring 32. This rocks the rock lever and causes the end 35 to engage the latch lever 36 and force it into engagement with the sector 37 where it will be held by slight relaxation of pressure on the pedal 13. The driver now removes his hand from the handle 31 whereupon the spring 32 rocks the rock lever to lift the end 35 off the lever 36. The latch lever at this time remains in engagement with the sector 37. When it is desired to release the brake, the driver applies slight pressure to the pedal 13 which relaxes the engagement between the latch lever and sector and the heavy end of said latch lever tilts the engaged end free from the sector so that the brake lever is free to move out of engaged position upon the driver removing his foot from the pedal.

In addition to the advantages heretofore pointed out, it is apparent that there are other advantages arising from features designed to meet certain conditions of operation. These will be better understood by remembering the fact that in assemblages designed to lock the brakes in set position, the brakes must be in their set position at the time the brake lock is made active, which requires the presence of a foot of the operator on the brake pedal at such time. In locks of the type which are operated by foot movements, this requires that both feet of the operator must be active at the same time, with the two operations being of a different nature. This makes it rather awkward for the operator, excepting possibly when the car is standing, at which time the upper part of the body is not being used in the operation of the machine, and the concurrent use of both feet can be had without difficulty. However, where the upper part of the body is being used in connection with other operations, the absence of stability through the concurrent use of both feet makes it difficult for the operator to maintain a position on his seat of sufficient stability to perform the various control manipulations required.

This condition led to the practice of using a hand for manipulating the locking structure, thus dividing the service between upper and lower parts of the body and leaving one foot free to aid in preserving stability. While such division aids in the respects indicated, it, in turn, can tend to complicate the use of the hands. If the machine is at rest, no difficulty is present since the hands are then free from service. Where, however, the brakes are being locked under emergency or like conditions, the difficulties are complicated by the change, since the emergency operation may require the use of both hands, in which case a temporary shift of a hand for this additional service, especially if required for any material length of time, could cause difficulty in other connections.

The advantage of the present assemblage lies in the fact that the device is so formed that no special care is required for the hand to properly operate the actuating mechanism, that there is practically no possibility of error, and that the power required is reduced to the minimum. The downward movement of rod 30 must overcome spring 32 and also the weighted end of latch member 36, but both resistances are of comparatively low value. On the other hand, the longer leverage of arm 29 increases the power effect, the result being that the effort to move the rod downward needs but a small amount of power, and since the rod is truly guided, the operator can quickly complete the cycle. When the foot has advanced the pedal, he then moves the rod downward to place the nose of the latch member in position, slightly releases the foot pressure to engage the nose with a tooth, whereupon he moves the hand to other duties. The operation is completed in a moment, leaving the brakes locked. Removal of the hand causes the rod and bell-crank lever element to return to normal inactive position through the action of spring 32. If the operator wishes to increase the brake pressure while initially locking the brakes, the rod is held depressed until the desired position is reached. Otherwise, the movement of the pedal releases the latching member, and the rod must be again depressed momentarily to take the new position. While the latter would seem to be slightly disadvantageous, the advantage comes through the ability to meet an emergency condition. The latter may have required initial locking, and as it progressed may require a definite and quick release to meet the conditions, at which time both hands would be otherwise engaged. The condition is met by the weighted latch member instantly releasing the nose and since the rod has been raised, the latch member is instantly made inactive automatically, leaving both hands and feet to meet the immediate conditions of the emergency.

In other words, the assemblage is always ready for instant operation, can be operated with a small amount of power and without the need of careful attention, with the operating means directly within the vision of the operator. Brake movement alone is required to release the locked brakes, the parts resuming their normal inactive positions immediately upon completion of their particular services, with the assemblage then in condition for instant succeeding service.

I claim:

In brake-locking assemblages for tractors and the like, wherein the brake pedal carries a toothed sector movable therewith, and wherein a pivoted latching member is positioned to permit cooperation with the sector throughout the range of sector movement, with the latching member normally inactive relative to the sector, the combination with an assemblage of such type, of means manually operative at will for moving the latching member into engagement with the sector to hold the brakes in locked position, said means comprising a bell-crank lever element having a fixed pivot point in the vicinity of the latching member, said lever element having a pair of arms differing in length and extending forwardly of the pivot point, the shorter arm carrying a projection adapted through lever element pivotal movement to cooperate with the nose zone of the latching member during movement of the latter into locking position, and an upwardly-extending operating rod of extended length, said rod having its lower end pivoted to the free end of the longer arm of the lever element and supported in its upper end zone by a bracket formation carried by the tractor adjacent the steering wheel, said rod having its upper end formed for manual manipulation by the hand of the operator to provide downward movement to the rod in the direction of rod length, the rod carrying a spring-co-operative with the supporting bracket for normally retaining the rod in raised position, said means being operative to provide movement of the latching member into engagement with the sector by hand downward actuation of the rod during periods when the brake pedal is being actuated by the foot with the hand manipulation limited to such rod downward movement and with comparatively light pressure.

ALVIN C. THOMPSON.

REFERENCES CITED

The following references are of record in the file of this patent:

UNITED STATES PATENTS

| Number | Name | Date |
|---|---|---|
| 1,654,321 | Collins | Dec. 27, 1927 |
| 1,823,695 | Moorhouse | Sept. 15, 1931 |
| 2,108,666 | Hall | Feb. 15, 1938 |
| 2,119,638 | Klampferer | June 7, 1938 |
| 2,388,002 | Maiwald | Oct. 30, 1945 |